United States Patent
Kopylovitz et al.

(10) Patent No.: US 8,577,836 B2
(45) Date of Patent: Nov. 5, 2013

(54) METHOD OF MIGRATING STORED DATA AND SYSTEM THEREOF

(75) Inventors: Haim Kopylovitz, Herzliya (IL); Ido Ben-Tsion, Ramat Gan (IL); Leo Corry, Ramat Gan (IL); Yechiel Yochai, Moshav Aviel (IL)

(73) Assignee: Infinidat Ltd., Herzliya (IL)

( * ) Notice: Subject to any disclaimer, the term of this patent is extended or adjusted under 35 U.S.C. 154(b) by 0 days.

(21) Appl. No.: 13/414,035

(22) Filed: Mar. 7, 2012

(65) Prior Publication Data

US 2012/0259810 A1 Oct. 11, 2012

Related U.S. Application Data

(60) Provisional application No. 61/449,905, filed on Mar. 7, 2012.

(51) Int. Cl.
*G06F 7/00* (2006.01)
*G06F 17/00* (2006.01)

(52) U.S. Cl.
USPC ............................................. 707/609

(58) Field of Classification Search
USPC ................................. 707/609, 822
See application file for complete search history.

(56) References Cited

U.S. PATENT DOCUMENTS

| | | | |
|---|---|---|---|
| 7,080,225 B1 * | 7/2006 | Todd .............................. | 711/165 |
| 7,124,275 B2 | 10/2006 | Gammel et al. | |
| 7,236,987 B1 | 6/2007 | Faulkner et al. | |
| 7,376,764 B1 * | 5/2008 | Todd .............................. | 710/38 |
| 7,636,764 B1 | 12/2009 | Fein | |
| 7,805,583 B1 * | 9/2010 | Todd et al. ..................... | 711/162 |
| 7,809,912 B1 * | 10/2010 | Raizen et al. ................... | 711/165 |
| 8,010,485 B1 * | 8/2011 | Chatterjee et al. ............. | 707/609 |
| 8,261,035 B1 * | 9/2012 | Tsypliaev et al. .............. | 711/165 |
| 2003/0046366 A1 * | 3/2003 | Pardikar et al. ................ | 709/219 |
| 2003/0051021 A1 | 3/2003 | Hirschfeld et al. | |
| 2003/0074523 A1 * | 4/2003 | Johnson ........................ | 711/112 |
| 2004/0080558 A1 * | 4/2004 | Blumenau et al. .............. | 347/19 |

(Continued)

FOREIGN PATENT DOCUMENTS

| | | |
|---|---|---|
| WO | 03062979 A2 | 7/2003 |
| WO | 2006045847 A1 | 5/2006 |
| WO | 2009044397 A2 | 4/2009 |
| WO | 2012114338 A1 | 8/2012 |

OTHER PUBLICATIONS

Co-pending U.S. Appl. No. 12/901,723, 0/10/13.

*Primary Examiner* — Robert Beausoliel, Jr.
*Assistant Examiner* — Nicholas Allen
(74) *Attorney, Agent, or Firm* — Browdy and Neimark, PLLC (57) ABSTRACT

A method of migrating data from a source storage resource to a destination storage resource involves selecting a source volume in the source storage resource; configuring in the destination storage resource a destination volume corresponding to the source volume and having the same properties; and redirecting I/O requests from an application running on a host to the destination volume instead of the source volume, whilst migrating data stored in the source volume to the destination volume. A storage system is operable as a destination storage system for migrating data from a source storage system, including means for configuring a destination volume corresponding to a source volume in the source storage system and a migration module having a non-transitory computer useable medium and operable to initiate read requests addressed to the source volume thereby enabling a background process of migrating data stored in the source volume to the destination volume.

10 Claims, 3 Drawing Sheets

(56) References Cited

U.S. PATENT DOCUMENTS

| | | |
|---|---|---|
| 2006/0212481 A1* | 9/2006 | Stacey et al. ............... 707/104.1 |
| 2009/0089534 A1 | 4/2009 | Zohar |
| 2009/0103432 A1* | 4/2009 | Trikoz et al. .................. 370/228 |
| 2009/0240880 A1 | 9/2009 | Kawaguchi |
| 2010/0153975 A1 | 6/2010 | Zwisler et al. |
| 2010/0205390 A1 | 8/2010 | Arakawa |
| 2010/0218039 A1* | 8/2010 | Brown et al. ..................... 714/6 |
| 2010/0274982 A1 | 10/2010 | Mehr et al. |
| 2010/0306174 A1 | 12/2010 | Otani |
| 2012/0011176 A1* | 1/2012 | Aizman ...................... 707/822 |

* cited by examiner

METHOD OF MIGRATING STORED DATA AND SYSTEM THEREOF

CROSS-REFERENCES TO RELATED APPLICATIONS

This application relates to and claims priority from U.S. Provisional Patent Application No. 61/449,905 filed on Mar. 7, 2012 and is incorporated herein by reference in its entirety.

FIELD

The present disclosure relates, in general, to data storage systems and respective methods for data storage, and, more particularly, to migrating stored data from one storage resource to another.

BACKGROUND

The problems of migrating stored data from one storage resource to another have been recognized in the conventional art and various systems have been developed to provide a solution, for example:

US Patent Application No. 2010/287345 (Cherian et al.) discloses systems and methods for data migration. The method may include allocating a destination storage resource to receive migration data. The method may also include assigning the destination storage resource a first identifier value equal to an identifier value associated with a source storage resource. The method may additionally include assigning the source storage resource a second identifier value different than the first identifier value. The method may further include migrating data from the source storage resource to the destination storage resource.

US Patent Application No. 2009/193206 (Ishii et al.) discloses a migration controller that creates, inside a migration-destination storage controller, a migration-destination volume, a migration-destination snapshot volume and a pool corresponding to a migration-source volume, a migration-source snapshot volume, and a pool, respectively. The migration controller reproduces an update history of a migration-targeted generation as a write process of difference data to the migration-destination volume. The migration-destination storage controller constructs the migration-destination snapshot volume in accordance with the update of the migration-destination volume.

SUMMARY

In accordance with certain aspects of the presently disclosed subject matter, there is provided a method for migration of data from a source system to a destination system. Neither of the storage systems needs to have any prior knowledge of proprietary data and metadata organization and handling in the other storage system. Accordingly, the source and destination storage systems can be provided by different vendors with no need in coordination of internal storing processes.

The method of migrating data comprises: a) upon selecting in the source storage resource a source volume, said volume characterized by certain properties; configuring in the destination storage resource a destination volume corresponding to the source volume and characterized by the same properties; and b) redirecting I/O requests from at least one applications running on at least one host to the destination volume instead of the source volume, whilst migrating data stored in the source volume to the destination volume.

The method can further comprise providing operations a)-b) for a next selected source volume, wherein the redirecting I/O requests to a next destination volume instead of the next source volume is provided after completing redirecting I/O requests to a previous destination volume instead of a previous source volume. Alternatively or additionally, operations a)-b) can be provided for a group of volumes, wherein redirecting I/O requests to volumes among a group of destination volumes instead of respective volumes among a group of source volumes is provided as an atomic operation.

Redirecting I/O requests can be provided by reconfiguring said at least one host and/or by reconfiguring all hosts running applications addressing the source volume, said reconfiguring provided as an atomic operation with respect to all said hosts and/or by reconfiguring all switches involved in directing I/O requests from all hosts running applications addressing the source volume, said reconfiguring provided as an atomic operation with respect to all said hosts. Redirecting can be provided with the help of a predefined set of instructions stored in a non-transitory computer-readable media, said set of instructions initiated responsive to data received from the destination system.

In accordance with further aspects of the presently disclosed subject matter, migrating data from the source volume to the destination volume can be provided as a background process with the help of read requests initiated by the destination storage resource and addressed to the source volume.

In accordance with further aspects of the presently disclosed subject matter, the method can further comprise configuring in the destination storage resource destination snapshots corresponding to the known source snapshots of the source volume and characterized by corresponding points in time; in response to read requests initiated by the destination storage resource and addressed to the source volume and the source snapshots, obtaining corresponding sections of the source volume and of the source snapshots; comparing data in the corresponding sections of the source volume and the source snapshots; if the compared sections comprise identical data, storing in the destination storage resource only one of the obtained sections and generating pointers in the destination volume and the destination snapshots, these pointers directed to the same stored section; and if the compared sections are different, storing in the destination storage resource all different sections and generating respective pointers in the destination volume and the destination snapshots.

In accordance with further aspects of the presently disclosed subject matter, the method can further comprise: in response to receiving an I/O request addressed to the destination volume, sending by the destination system a read request to the source volume in a case the respective I/O operation requests data missing in the destination volume.

In accordance with other aspects of the presently disclosed subject matter, there is provided a storage system operable as a destination storage system for migrating data from a source storage system. The system comprises means for configuring a destination volume corresponding to a source volume selected in the source storage system and characterized by the same properties; and a migration module comprising a non-transitory computer useable medium and operable to initiate read requests addressed to the source volume thereby enabling a background process of migrating data stored in the source volume to the destination volume.

The migration module can be operable to accommodate all data related to the initial setup of the destination storage system. Alternatively or additionally, the migration module can be operable to initiate redirecting I/O requests from at least one applications running on at least one host to the destination volume instead of the source volume method. The migration module can provide said initiation by sending data indicative of completion of the initial setup of the destination system.

In accordance with certain aspects of the presently disclosed subject matter, the storage system can comprise means for configuring destination snapshots corresponding to the known source snapshots of the source volume and characterized by corresponding points in time; means for obtaining, in response to read requests initiated by the migration module and addressed to the source volume and the source snapshots, corresponding sections of the source volume and of the source snapshots; means for comparing data in the corresponding sections of the source volume and the source snapshots; means enabling storing only one of the obtained sections and generating pointers in the destination volume and the destination snapshots, these pointers directed to the same stored section in a case when the compared sections comprise identical data; and means enabling storing all different sections and generating respective pointers in the destination volume and the destination snapshots, in a case when the compared sections are different.

In accordance with certain aspects of the presently disclosed subject matter, the system can further comprise means for detecting data missing in the destination volume for servicing a received i/o request addressed to the destination volume, wherein the migration module is configured to send a read request to the source volume for obtaining said missing data.

BRIEF DESCRIPTION OF THE DRAWINGS

In order to understand the invention and to see how it can be carried out in practice, embodiments will now be described, by way of non-limiting example only, with reference to the accompanying drawings, in which.

DETAILED DESCRIPTION OF EMBODIMENTS

In the following detailed description, numerous specific details are set forth in order to provide a thorough understanding of the invention. However, it will be understood by those skilled in the art that the present invention can be practiced without these specific details. In other instances, well-known methods, procedures, components and circuits have not been described in detail so as not to obscure the present invention.

Unless specifically stated otherwise, as apparent from the following discussions, it is appreciated that throughout the specification discussions utilizing terms such as "processing", "computing", "assigning", "determining", "generating", "initiating", "migrating", "writing", "selecting", "reading", "storing", "managing" or the like, refer to the action and/or processes of a computer that manipulate and/or transform data into other data, said data represented as physical, such as electronic, quantities and/or said data representing the physical objects. The term "computer" should be expansively construed to cover any kind of electronic system with data processing capabilities, including, by way of non-limiting example, a storage system and parts thereof disclosed in the present applications.

The operations in accordance with the teachings herein can be performed by a computer specially constructed for the desired purposes or by a general-purpose computer specially configured for the desired purpose by a computer program stored in a computer readable storage medium.

Embodiments of the present invention are not described with reference to any particular programming language. It will be appreciated that a variety of programming languages can be used to implement the teachings of the inventions as described herein.

The references cited in the background teach many principles of migrating stored data that are applicable to the presently disclosed subject matter. Therefore the full contents of these publications are incorporated by reference herein where appropriate for appropriate teachings of additional or alternative details, features and/or technical background.

In the drawings and descriptions, identical reference numerals indicate those components that are common to different embodiments or configurations.

Figure 1:
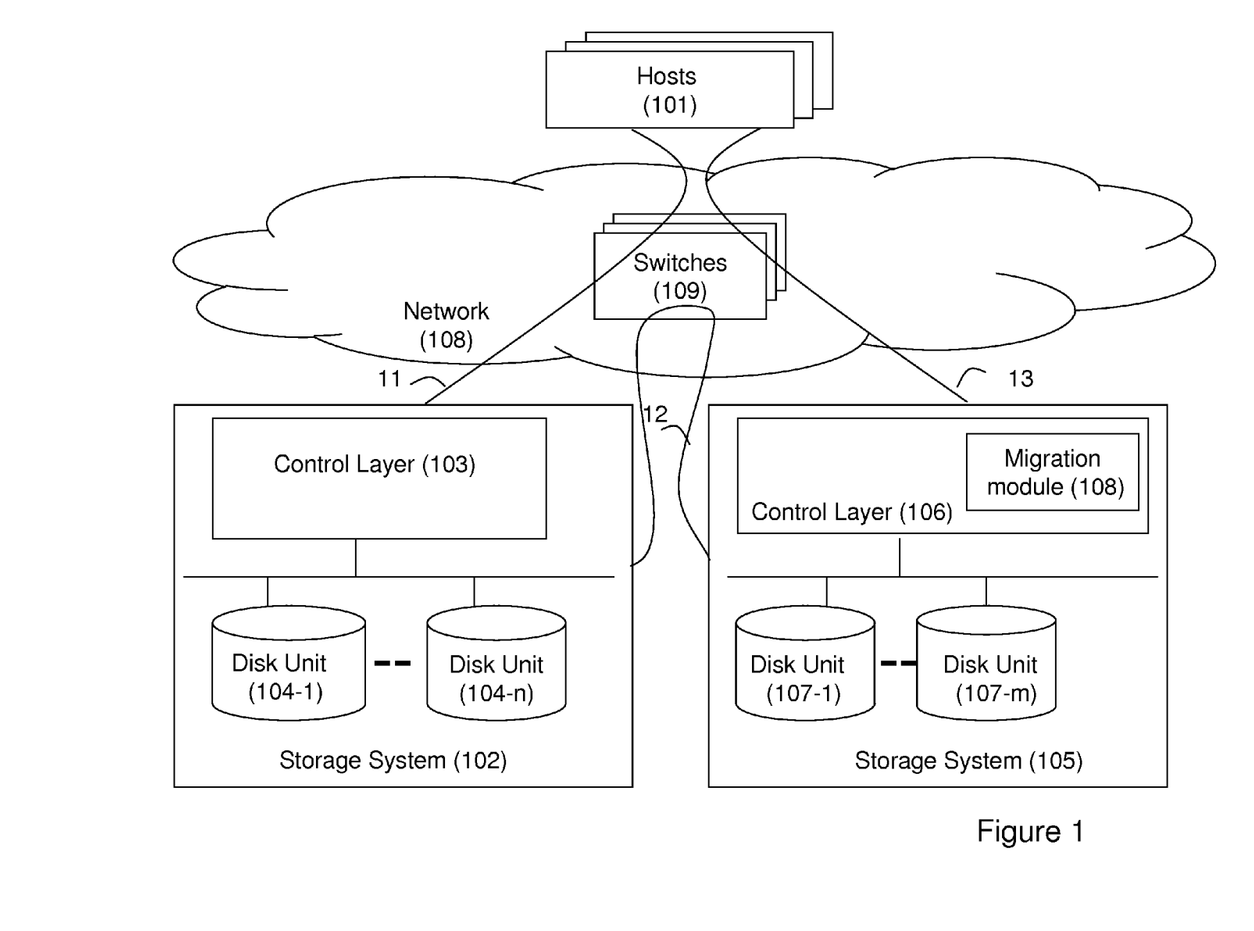
FIG. 1 illustrates a schematic functional block diagram of an exemplary storage arrangement in accordance with certain embodiments of presently disclosed subject matter.

Bearing this in mind, attention is drawn to FIG. 1 illustrating an exemplary storage arrangement in accordance with certain embodiments of the currently presented subject matter.

Host computers (workstations, application servers, etc.) illustrated as 101 share common storage means provided by a storage system 102. The storage system 102 comprises a storage control layer 103 operatively coupled to the plurality of host computers and a plurality of data storage devices 104-1-104n constituting a physical storage space optionally distributed over one or more storage nodes. The storage control layer comprises one or more appropriate storage control devices, and is operable to control interface operations (including I/O operations) between the plurality of hosts and the plurality of data storage devices. The storage control layer 103 is further operable to handle a virtual representation of physical storage space and to facilitate necessary mapping between the physical storage space and its virtual representation. The virtualization functions can be provided in hardware, software, firmware or any suitable combination thereof. Optionally, the functions of the control layer may be fully or partly integrated with one or more host computers and/or storage devices and/or with one or more communication devices enabling communication between the hosts and the storage devices. Optionally, a format of logical representation provided by the control layer may differ depending on interfacing applications.

The physical storage space can be implemented using any appropriate permanent storage medium, including, by way of non-limiting example, one or more Solid State Disk (SSD) drives, Hard Disk Drives (HDD) and/or one or more disk units (DUs), comprising several disk drives. The storage control layer and the storage devices can communicate with the host computers and within the storage system in accordance with any appropriate storage protocol.

The hosts are connected to the storage systems via a network 108.

In certain embodiments, network 108 can allow the hosts 101 to communicate with the storage resources as locally attached storage resources. In the same or alternative embodiments, network 108 can include a communication infrastructure comprising, for example, one or more switches 109. The network 108 can enable block I/O services and/or file access services to the storage resources. The network can be implemented as, or may be a part of, a storage area network (SAN), local area network (LAN), a virtual private network (VPN), the Internet, and/or any other appropriate architecture that facilitates necessary communication between the hosts and the storage resources.

As illustrated in FIG. 1, the network can comprise (and/or connect) more than one storage system. The storage resources are characterized by identifiers (e.g., iSCSI qualified name, Fibre Channel World Wide Name, etc.) of each storage system and/or of each port in the storage system. Applications running on the hosts are typically programmed with an adequate indication of the storage resources to be directed for I/O operations.

For purpose of illustration only, the following description is provided with respect to I/O operations based on SCSI protocol. Those skilled in the art will readily appreciate that the teachings of the present invention are applicable in a similar manner to other protocols (e.g. Fiber Channel, Fiber Channel over Internet, etc.).

In the case of SCSI protocol, an application can be connected via an initiator port that is programmed with an identifier of a target to which the I/O operations of the application are to be directed. For example, connection between a host and a logical volume can be defined by ITL, where I is the initiator port in the host, T is the target port in the storage system, and L is the respective LUN (logical unit number) of the volume exported via the target port T. Typically, a storage administrator defines the LUN and T, and agrees with a host administrator about the connection via the ITL. Based on ITL, I/O requests coming from the application running on the host will reach the right logical volume (optionally, via the switch in case of a switched environment), and, thus, the requests are adequately serviced.

The switches 109 can be programmed to accommodate identifiers (e.g. target names, IP addresses, World Wide port names, etc.) of each storage system and/or each port in the storage system.

From time to time, an administrator may desire to migrate data from one storage resource to another. For example, a storage system 105 (destination system) may need to replace the storage system 102 (source system) in storing all or part of the volumes that are currently stored in the storage system 102. Such replacement can be provided by migration of respective data from the storage system 102 to the storage system 105.

The illustrated storage system 105 comprises a storage control layer 106 comprising one or more appropriate storage control devices operatively coupled to the plurality of host computers and a plurality of data storage devices 107-1-107n constituting a physical storage space optionally distributed over one or more storage nodes. The destination system can comprise a migration volume 108 operable to enable migration operations further detailed with reference to FIGS. 2 and 3. The hosts can be connected to the storage system 102 via link 11 and/or to the storage system 105 via link 13.

Figure 2:
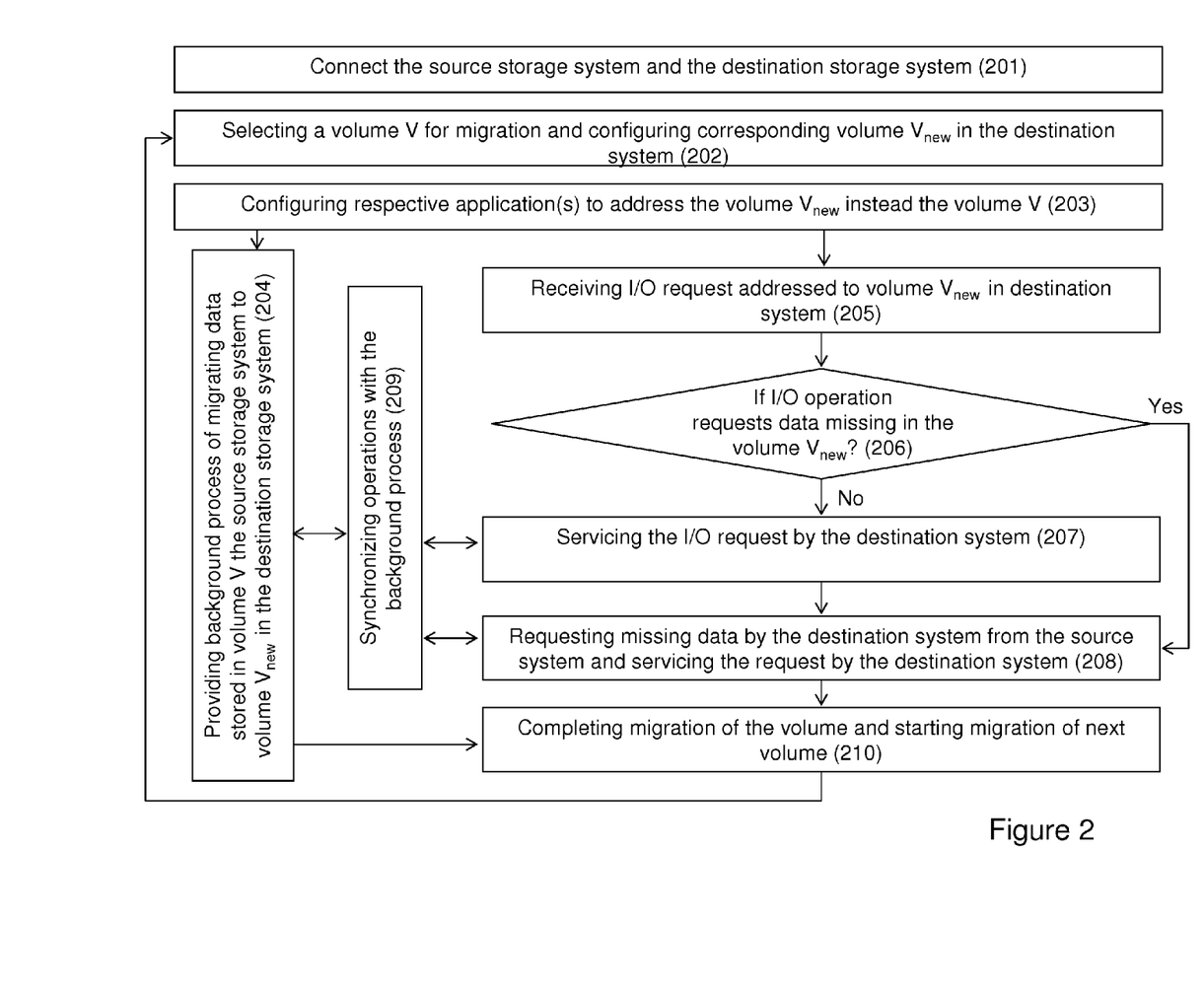
FIG. 2 illustrates a generalized flow diagram of a migration process in accordance with certain embodiments of the currently presented subject matter.

FIG. 2 illustrates a generalized flow diagram of a migration process in accordance with certain embodiments of the currently presented subject matter.

The process of migration data from a source storage system to a destination storage system starts from providing initial setup of the destination system. During initial setup of the destination system, the respective hosts are connected to the source storage system serving I/O requests. The initial setup includes several operations which can be provided in any appropriate order.

The initial setup includes connecting (201) the source storage system and the destination storage system. The source and the destination storage system can be connected directly or via the network 108 (e.g., as illustrated in FIG. 1, with the help of link 12 passing via the switches 109). Upon selecting in the source storage system a volume V for migration, the storage administrator configures (202) corresponding volume $V_{new}$ in the destination system. The destination volume $V_{new}$ is configured to have the same properties (e.g. size, name, thin/thick volume, read-only/read-write volume, etc.) as the source volume V.

A host H communicates with the volume V via an initiator port I. A connection between the given host and the source storage system is characterized by ITL1 corresponding to the initiator port I, target port T1 and LUN1, where LUN1 is the logical unit number characterizing the volume V exported from the source storage system via port T1.

The storage administrator pre-establishes connection between the host and the destination storage system (illustrated in FIG. 1 as link 13), and configures the destination storage system so that $V_{new}$ will be exported as $LUN_{new}$ via a target port $T_{new}$.

The storage administrator further configures the destination storage system to act as an initiator (e.g. via initiator port 12) that can reach the volume V exported as LUN2 via T2 (or any other port in the source storage system). Thus, there is configured connection ITL2: I2, T2, LUN2; and the destination storage system is configured to send I/O requests to volume V in the source storage system, and can read any data stored in volume V.

The initial setup of the destination system can be provided with the help of migration module 108 comprised in the control layer 106. The migration module can be further operable to accommodate all data related to the initial setup of the destination storage system.

Hence, the initial setup of the destination storage system is over.

The host administrator reconfigures (203) the host by replacing ITL1 with $ITL_{new}$, corresponding to the initiator port I and target port $T_{new}$, and $LUN_{new}$. Upon reconfiguring, all I/O requests previously directed to V are directed to $V_{new}$. In a case of several hosts communicating with the volume V, the connections between the respective initiator ports of these hosts and the target port shall be reconfigured to target port $T_{new}$ and $LUN_{new}$, such reconfiguring to be provided as an atomic operation.

Alternatively or additionally, reconfiguring can be provided at the switch level, wherein the switches are configured to direct I/O requests from the host H to volume $V_{new}$ instead of volume V.

It should be noted that reconfiguring the connection between the initiator port and the target port can be provided automatically, e.g. with the help of a predefined script. By way of non-limiting example, reconfiguring can be initiated responsive to data received from the migration module, this data being indicative of completion of the initial setup of the destination system.

Reconfiguring the connection between the initiator port and the target port involves a non-zero time (up to several seconds). However, operating an application addressing volume V, and, later, volume $V_{new}$, can be adapted to handle the situation when I/O requests are not serviced by the storage system for several seconds. Typically, during the replacement, the application can react with a retry; and I/O requests will be satisfied upon reconfiguring the initiator port to address the I/O requests to volume $V_{new}$.

Upon reconfiguring the connections between initiator port and the target port, the destination storage system starts a background process (204) of migrating data stored in the source storage system to the destination storage system. For example, the destination storage system can act as an initiator that reads data in the source storage system via ITL2. The destination storage system can start sending read requests to volume V in the source storage system, so that all data of volume V will be read and stored in volume $V_{new}$. The background migration process can be performed as a sequence of read requests of successive data chunks in volume V, starting from LBA 0 and up to the last block of the volume. The background migration process can be provided with the help of the migration module 108.

While running the background migration process, the destination storage system starts to receive (205) an I/O request addressed to the volume $V_{new}$. Responsive to receiving an I/O request, the destination system checks (206) if the respective I/O operation requests data missing in the volume $V_{new}$ (for example, if a read request needs to read, and/or a write request needs to modify data not yet migrated to the volume $V_{new}$ in the destination system, etc.). If all requested data have been already migrated to the destination system, the I/O request is served (207) by the destination system. If there are requested data missing in the volume $V_{new}$, the destination system addresses (208) the source storage system with a read request for the missing data, receives and stores the respective data, and further serves the I/O request.

Eventually, all data stored in volume V of the source storage system is completely migrated (210) to the volume $V_{new}$ of the destination storage system, and the entire migration process can be repeated for a next volume selected in the source storage system.

Optionally, initial setup of a new volume in the destination system can be provided at any time (e.g. all new volumes corresponding to the volumes in the source storage system can be configured simultaneously). However, reconfiguring initiator—target connections is provided sequentially for each volume or each group of volumes. The reconfiguring process can be provided, for example, with the help of a script running on the host and replacing initiator-target connection (ITL1 by $ITL_{new}$) for one volume after replacing for the previous volume has been completed. The background migration process for a given volume can be provided any time after the reconfiguration process of the given volume, and, optionally, in parallel with background migration processes of other volumes.

Alternatively or additionally, in certain embodiments of the currently presented subject matter, there can be provided a simultaneous migration of a group of volumes (for example, volumes constituting a consistency group and/or a volume and all of its snapshots). In such a case, reconfiguring the connections between the initiator port and the target ports of respective volumes is provided as an atomic command for all volumes in the group. It should be noted that size of the group is limited by allowable downtime required for reconfiguring the respective connections.

Among advantages of certain embodiments of the presently disclosed subject matter is implementing a seamless and gradual migration process such that the required downtime is close to nil. The proposed migration process is transparent for one or more applications running on respective host(s).

Servicing I/O requests by the destination system can be synchronized (209) with the background migration process. For example, if a write request which arrived at the destination storage system is related to data that has not yet been migrated from the source storage system, the background migration process has to be aware of this. Such awareness is important to avoid overwriting the lastly modified piece of data by corresponding out-dated piece of data migrating from the source system. Likewise, if certain data is migrated from the source storage system to the destination storage system in response to request for missing data (208), such data does not have to be migrated as part of the background migration process. The required synchronization can be provided with the help of any suitable procedure known in the art.

The migration process can be optimized by implementing thin volume provisioning techniques. In accordance with certain embodiments of the presently disclosed subject matter, the process of thin volumes based migration can be further combined with a storage optimization process based on identification of zero and non-zero data units detailed in U.S. patent application Ser. No. 12/901,723 filed Oct. 11, 2011, assigned to the assignee of the present application and incorporated herewith by reference in its entirety. In accordance with certain embodiments of the currently presented subject matter, when data is read from the source storage system to the destination storage system, and before it is stored in the destination storage system, the destination storage system checks if the data is a zero-chunk. Zero-chunk will not be stored but rather it will be indicated as a pure-zero chunk in the corresponding table. The destination system can be configured as operable to de-allocate data chunks that are identified as comprising zero-only strings. The system maintains a table of such de-allocated chunks so that upon a read request of any such chunks the system will return a string of zeros to the host. Among advantages of such a combination is a shorter migration process and improved resource utilization in the destination storage system.

In accordance with certain embodiments of the presently disclosed subject matter, the migration process can be further combined with techniques disclosed in PCT Patent Application No. PCT/IL2012/050056 filed Feb. 22, 2012, assigned to the assignee of the presently disclosed subject matter and incorporated herein in its entirety. Accordingly, when configuring the volume $V_{new}$ in the destination storage system, the storage administrator can configure also a mapping structure associated with the volume $V_{new}$, and handling mapping between addresses in the volume $V_{new}$, and corresponding physical address space in the destination storage system. By way of non-limiting example, the mapping structure can be initially defined as a degenerated trie with only one leaf indicating that initially all data required for any I/O request to the volume $V_{new}$, are stored in the source storage system. The trie is modified during the background migration process and/or responsive to I/O requests addressed to the volume $V_{new}$, and new leaves are generated. Each leaf in the trie represents a contiguous range of addresses in the volume $V_{new}$, and indicates an offset of a corresponding contiguous range of physical addresses in the destination storage system or indicates that respective data has not yet been migrated to the destination storage system.

Figure 3:
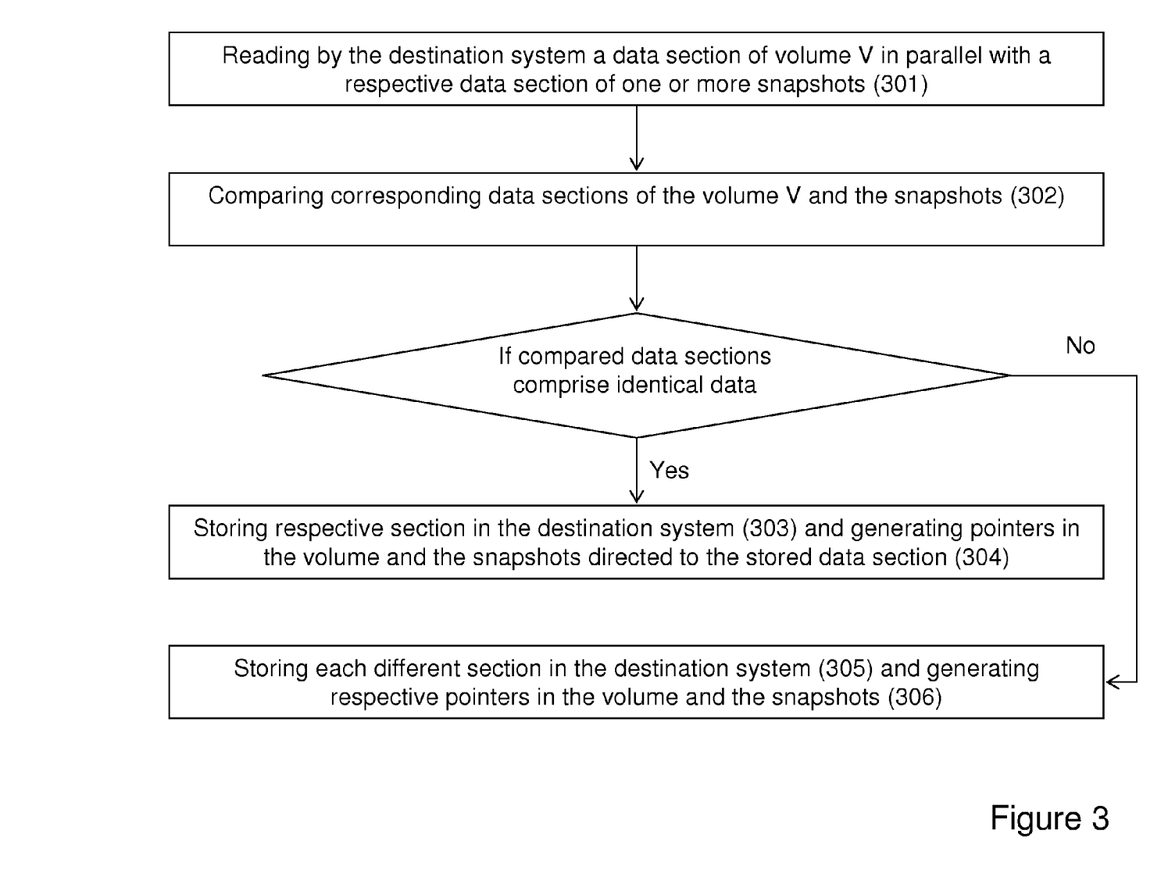
FIG. 3 illustrates a generalized flow diagram of a migration process of a volume with its snapshots in accordance with certain embodiments of the currently presented subject matter.

Referring to FIG. 3, there is illustrated a generalized flow diagram of a migration process of a volume with its snapshots in accordance with certain embodiments of the currently presented subject matter.

Volume V can have one or more snapshots generated in the source storage system, each snapshot logically storing the storage contents of the volume V at a respective point in time. For purpose of illustration only, it may be assumed that at the point in time $T_m$ intended for migrating the volume V, all physical data sections corresponding to the volume V and physical data sections corresponding to its snapshot S are identical except for one section D. Accordingly, the volume V points to data section $D_v$ and its snapshot S points to corresponding data section $D_s$, while commonly pointing to all the rest of data sections.

In the contemporary art, migration of the volume and its snapshots requires knowledge of the exact way in which the source storage system internally organizes the snapshot dependency, such knowledge not usually being available for the destination system. Accordingly, in the contemporary art, the snapshots are usually dismissed, and the migration is completed for the source volume alone. This approach involves loss of information that can be valuable to the user. Hence, in cases when the user does not want to lose that data, he can follow an alternative approach, namely copying the volume, and independently copying the snapshots as different independent volumes. This approach, however, involves performance penalties.

In accordance with certain aspects of the currently presented subject matter, a volume can be migrated together with its known snapshots with no need of prior knowledge of proprietary details of data and metadata organization in the source and/or destination storage system. Names of snapshot and/or respective LUNs can be provided by a user, host administrator or otherwise obtained before starting the migration process.

The storage administrator configures the destination storage system to act as an initiator (e.g. via initiator port 12) that can reach the volume V exported as LUN2 via T2, snapshot $S_1$ exported as LUNS1 via T2 (or any other port in the source storage system), snapshot $S_n$ exported as LUNSn via T2, etc. Thus, there are configured connections between the destination system as initiator and volume V and its snapshots $S_1$-$S_n$ in the source storage system. The destination storage system sends read requests (301) to the volume V and its known snapshots. Upon obtaining the requested data, the destination storage system compares (302) (for example with the help of the migration module 108) corresponding sections of the volume V and its known snapshots. If the compared sections comprise identical data, only one of the sections is stored (303). The destination system (e.g. using its snapshot functionality) further generates (304) pointers in the volume $V_{new}$ and in its snapshots $S_{new1}$-$S_{newN}$, these pointers directed to the same stored section. If the compared sections are different, all different sections will be stored (305), while the snapshot mechanism in the destination system generates respective pointers to the volume $V_{new}$ and its snapshots $S_{new1}$-$S_{newN}$. By way of non-limiting example, in a case of a single snapshot $S_1$, pointer in the volume $V_{new}$ is generated to direct to the section stored upon reading the volume V, and pointer in the snapshot $S_{new1}$ is generated to direct to the non-identical section stored upon reading the snapshot $S_1$ Likewise, the sections of the volume and respective sections of multiple snapshots can be compared, and the respective multiple pointers can be generated accordingly.

Each of the snapshots $S_{new1}$-$S_{newN}$ maintained by the destination storage system corresponds to the same point in time as the respective snapshot among snapshots $S_1$-$S_n$ maintained by the source storage system.

It is to be understood that the presently disclosed subject matter is not limited in its application to the details set forth in the description contained herein or illustrated in the drawings. The presently disclosed subject matter is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the presently disclosed subject matter.

It will also be understood that the system according to the presently disclosed subject matter can be implemented, at least partly, as a suitably programmed computer. Likewise, the presently disclosed subject matter contemplates a computer program being readable by a computer for executing the disclosed method. The presently disclosed subject matter further contemplates a machine-readable memory tangibly embodying a program of instructions executable by the machine for executing the disclosed method.

Those skilled in the art will readily appreciate that various modifications and changes can be applied to the embodiments of the presently disclosed subject matter as hereinbefore described without departing from its scope, defined in and by the appended claims.

The invention claimed is:

1. A method of migrating data from a source storage system to a destination storage system, the method comprising:
   a) upon selecting in the source storage system a source volume, said source volume characterized by certain properties; configuring in the destination storage system a destination volume corresponding to the source volume and characterized by the same properties and configuring in the destination storage system destination snapshots corresponding to known source snapshots of the source volume and characterized by corresponding points in time;
   b) redirecting I/O requests from at least one applications running on at least one host to the destination volume instead of the source volume, whilst migrating data stored in the source volume to the destination volume; and
   c) in response to read requests initiated by the destination storage system and addressed to the source volume and the source snapshots:
      obtaining corresponding sections of the source volume and of the source snapshots;
      comparing data in the corresponding sections of the source volume and the source snapshots;
      if the corresponding sections comprise identical data, storing in the destination storage system only one of the corresponding sections and generating pointers in the destination volume and the destination snapshots, these pointers directed to the same stored section; and
      if the corresponding sections are different, storing in the destination storage system all different sections and generating respective pointers in the destination volume and the destination snapshots.

2. The method of claim 1 wherein said redirecting I/O requests is provided by reconfiguring said at least one host.

3. The method of claim 1 wherein said redirecting I/O requests is provided by reconfiguring all hosts running applications addressing the source volume, said reconfiguring provided as an atomic operation with respect to all said hosts.

4. The method of claim 1 wherein said redirecting I/O requests is provided by reconfiguring all switches involved in directing I/O requests from all hosts running applications addressing the source volume, said reconfiguring provided as an atomic operation with respect to all said hosts.

5. The method of claim 1 wherein said redirecting is provided with the help of a predefined set of instructions stored in a non-transitory computer-readable media, said set of instructions initiated responsive to data received from the destination system.

6. The method of claim 1 wherein said migrating data from the source volume to the destination volume is provided as a background process with the help of read requests initiated by the destination storage system and addressed to the source volume.

7. The method of claim 1 further comprising providing operations a)-b) for a next selected source volume, wherein the redirecting I/O requests to a next destination volume instead of the next source volume is provided after completing redirecting I/O requests to a previous destination volume instead of a previous source volume.

8. The method of claim 1 wherein operations a)-b) are provided for a group of volumes, wherein redirecting I/O requests to volumes among a group of destination volumes instead of respective volumes among a group of source volumes is provided as an atomic operation.

9. The method of claim 1 further comprising:
in response to receiving an I/O request addressed to the destination volume, sending by the destination system a read request to the source volume in a case the respective I/O operation requests data missing in the destination volume.

10. A computer program product comprising a non-transitory computer useable medium having computer readable program code embodied therein for operating a storage system operable as a destination storage system for migrating data from a source storage system, the computer program product comprising:
computer readable program code for causing the computer to configure in the destination storage system a destination volume corresponding to a source volume selected in the source storage system and characterized by the same properties;

computer readable program code for causing the destination storage system to initiate read requests addressed to the source volume thereby enabling a background process of migrating data stored in the source volume to the destination volume;

computer readable program code for causing the computer to configure in the destination storage system destination snapshots corresponding to known source snapshots of the source volume and characterized by corresponding points in time;

computer readable program code for causing the computer, in response to read requests initiated by the destination storage system and addressed to the source volume and the source snapshots;
to obtain corresponding sections of the source volume and of the source snapshots;
to compare data in the corresponding sections of the source volume and the source snapshots;
if the corresponding sections comprise identical data, to store in the destination storage system only one of the corresponding sections and to generate pointers in the destination volume and the destination snapshots, these pointers directed to the same stored section; and
if the corresponding sections are different, to store in the destination storage system all different sections and to generate respective pointers in the destination volume and the destination snapshots.

* * * * *